Sept. 17, 1940.  E. J. VALLEN  2,215,021

MOTOR DRIVEN CABLE CONTROL

Filed Jan. 6, 1939

INVENTOR

EARL J. VALLEN

BY

*Ralph Barrow*

ATTORNEY

Patented Sept. 17, 1940

2,215,021

UNITED STATES PATENT OFFICE 2,215,021

MOTOR DRIVEN CABLE CONTROL

Earl J. Vallen, Akron, Ohio

Application January 6, 1939, Serial No. 249,668

3 Claims. (Cl. 254—168)

This invention relates to motor driven cable controls and has particular relation to apparatus for controlling the operation of curtains, as for example, for use in theaters and auditoriums.

An object of the invention is to provide in apparatus of the character described control mechanism which automatically adjusts itself to take up slack in the cable and to maintain the cable under constant tension.

Another object of the invention is to provide apparatus of the character described in which may be used an automatic limit switch for limiting the travel of cable but in which the motor cannot be loaded an amount greater than the weight of the motor unit resting on the cable so that the motor cannot be destroyed by an overload such as might occur where the limit switch fails to function or the cable drive and control system become bound because the cable overruns predetermined limits of travel in either direction, or for other reasons, the motor unit in such cases relieving the driving force on the cable greater than the weight and causing slippage to occur between the cable driving sheave and the cable.

Another object of the invention is to provide apparatus of the character described which is simple to install, and easy to adjust for limiting the travel of the curtain.

Another object of the invention is to provide apparatus of the character described which is compact, simple in operation, and inexpensive to manufacture.

These and other objects of the invention will be manifest from the following brief description and the accompanying drawing.

Figure 1:
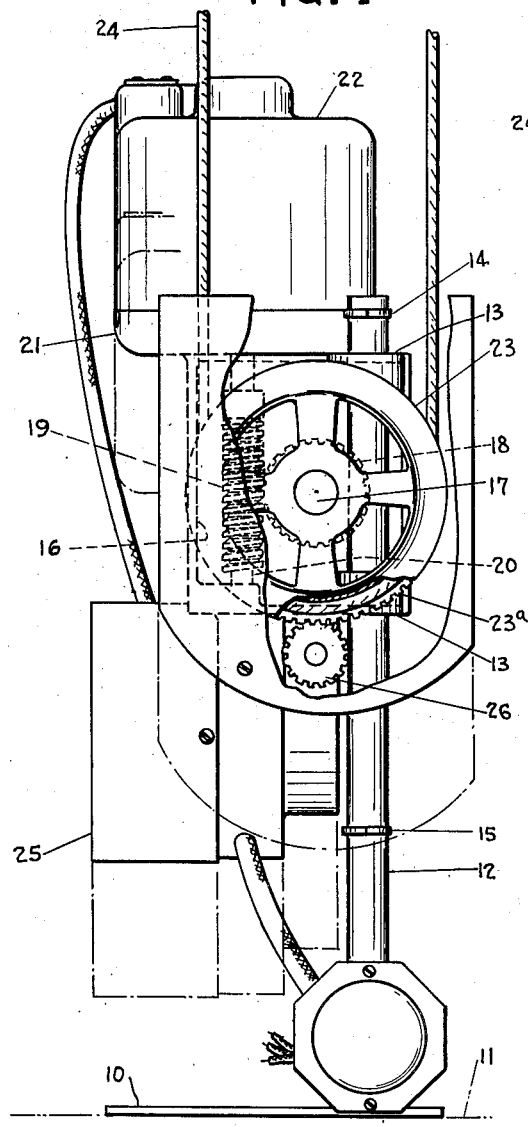
Figure 1 is a front elevation, partly broken away, of a curtain control unit embodying the invention.
Figure 2:
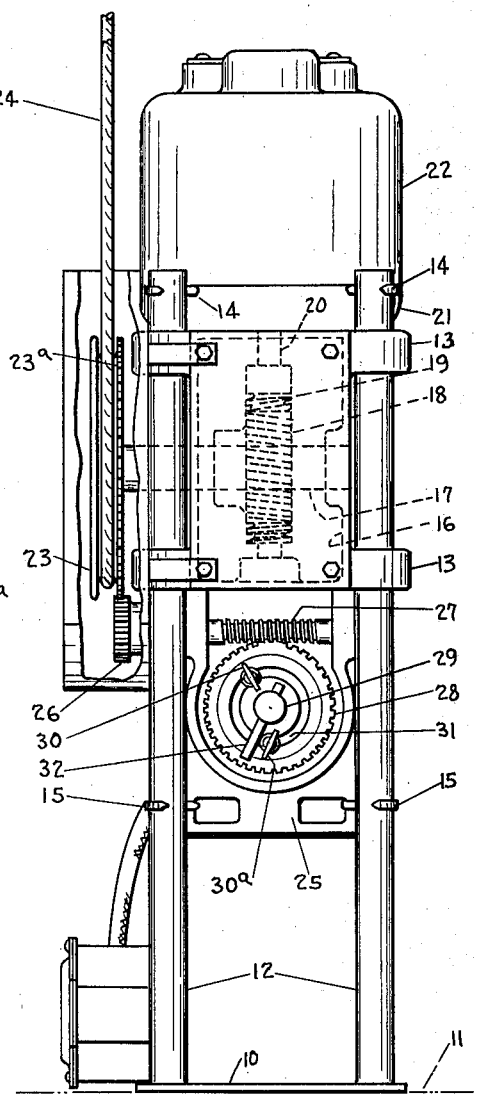
Figure 2 is an end elevation, partly broken away, as viewed from the right thereof.

Referring to the drawing, the numeral 10 designates a base plate which preferably is secured to the floor 11 by any suitable means (not shown). Fixed on the base 10 may be a pair of upright guide rods 12, 12 upon which is slidably mounted a crosshead 13, vertical movement of the latter being limited by means of upper and lower stop members 14, 14 and 15, 15 respectively, fixed to the rods 12.

Within a hollow casing or housing 16, secured to crosshead 13 or integral therewith, there may be rotatably mounted a shaft 17 having fixed thereon a worm gear 18 which engages a worm 19 on a shaft 20, the latter being driven through a suitable reduction gearing 21 by a motor 22, preferably of the reversing type, mounted on crosshead 13. An outwardly extended portion of shaft 17 may have fixed thereon a sheave 23 about which is trained a flexible cable 24, as for example, the cable of a curtain or back-drop (not shown) of the usual type used for theaters and auditoriums. The arrangement is such that the entire control unit, vertically guided on the shafts 12 (see chain-dotted position in Figure 1), is supported or floats in a loop in cable 24 formed about sheave 23.

For controlling the travel of cable 24, and therefore the travel of the curtain or other device (not shown) to which said cable is operatively connected, a suitable timing or limit switch 25 may be carried by crosshead 13. Switch 25 preferably is operated automatically to cut off motor 22 for predetermined limits of travel of cable 24. To this end a flange 23$^a$ of sheave 23 may be provided with teeth for meshing with a gear 26 fixed on a worm shaft 27 rotatably mounted in the housing of switch 25, and worm shaft 27 in turn meshes with a worm gear 28 journalled on a shaft 29 which controls switch 25. Gear 28 may be provided with a pair of stop members 30 and 30$^a$ adjustably fixed in an annular groove 31 in said gear, the stops 30, 30$^a$ being engageable with a pin 32 secured in shaft 29 for tripping switch 25 to stop motor 22. It will be understood that the gearing between sheave 23 and switch 25 is such that the travel of the stops 30 is proportionate to the travel of cable 24 and therefore to the travel of a curtain operated thereby.

In the use of the control unit to operate curtains or the like, an operator presses a push-button (not shown) to start motor 22, to thereby drive shaft 17 with sheave 23 thereon, which in turn frictionally drives cable 24. When cable 24 has moved a predetermined distance of travel the stops 30, 30$^a$ carried by gear 28 will contact pin 32 on shaft 29 to rotate the latter a sufficient amount to operate switch 25 and stop the motor 22. Switch 25, upon being operated to stop motor 22 for one limit position of cable 24 preferably is automatically set by means of suitable mechanism (not shown), for running the motor in reverse direction the next time the operator presses the push-button to return cable 24 to the other limit position thereof, at which limit position motor is stopped by action of the other stop member 30$^a$.

It is readily seen that the control unit carried by the crosshead 13 will float on cable 24, whereby slack is automatically taken up on the cable. The unit will also raise up on an overload of cable 24 before the stops 30 and 30ª act to cut off the power to motor 22, the control motor then merely running without driving the cable because of the tendency of the unit to float on the posts 12 to relieve the frictional drive on the cable. The amount of driving force between cable 24 and sheave 23 cannot exceed the weight of the floating control unit. For this reason any overload on cable 24 beyond the weight of the motor unit causes the motor unit to relieve the motor of the overload.

Modifications of the invention may be resorted to without departing from the spirit thereof or the scope of the appended claims.

What is claimed is:

1. A control apparatus for driving cable or the like, comprising a fixed support, a motor unit, a member on said motor unit to be driven thereby, means for mounting the motor unit for free vertical movement on said support, a cable looped under said driven member to support the weight of said motor unit, whereby the weight of said motor unit applies driving force to said cable in the loop notwithstanding lengthening or shortening of the loop, and means carried by said motor unit operable by said motor adapted to cut off said motor at predetermined limits of travel of said cable.

2. A control apparatus for driving cable or the like, comprising a fixed support, a motor unit, a member on said motor unit to be driven thereby, means for mounting the motor unit for free vertical movement on said support, a cable looped under said driven member to support the weight of said motor unit, whereby the weight of said motor unit applies driving force to said cable in the loop notwithstanding lengthening or shortening of the loop, and means on said motor unit operable by said driven member to cut off said motor at predetermined limits of travel of said cable.

3. A control apparatus for driving cable or the like, comprising a fixed support, a motor unit, a sheave on said motor unit to be driven thereby, means for mounting the motor unit on said support for free vertical movement relative thereto, a cable looped under said sheave to support the weight of said motor unit, the weight of said motor unit applying driving force to said cable in the loop notwithstanding lengthening or shortening of the loop, and means carried by said motor unit operable by said motor adapted to cut off said motor at predetermined limits of travel of said cable.

EARL J. VALLEN.